Jan. 3, 1950     H. T. MOLER     2,493,685
VENTILATING DEVICE FOR AUTOMOBILES
Filed Sept. 15, 1947
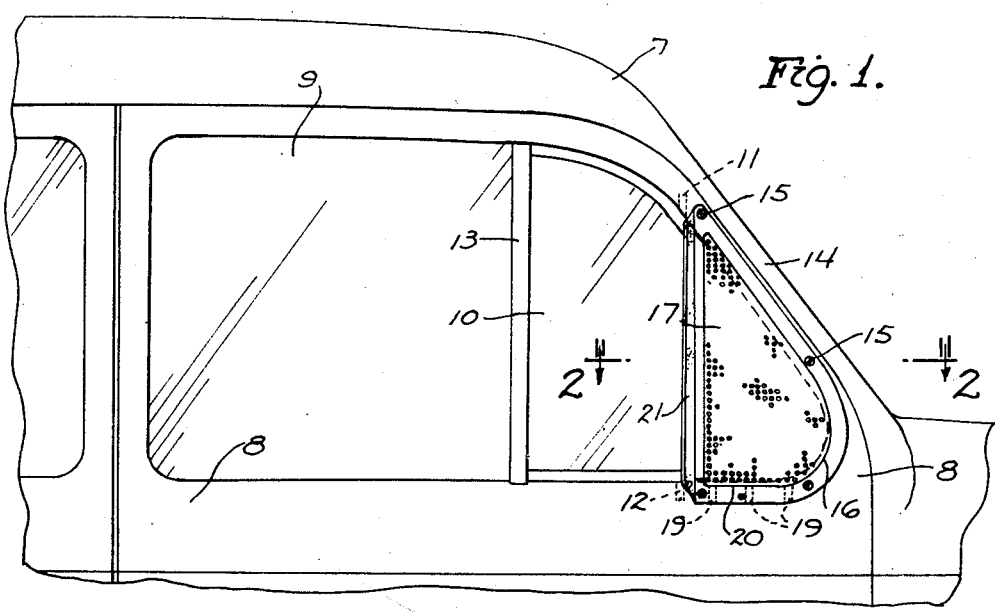
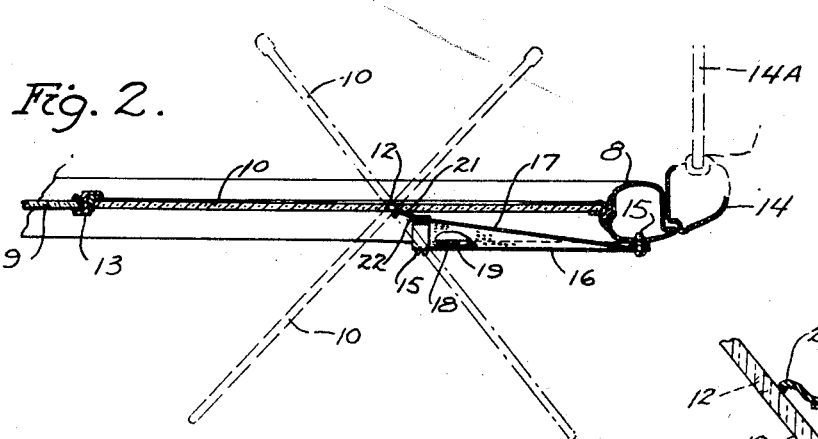
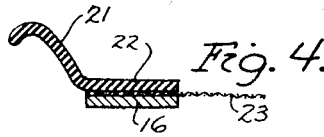
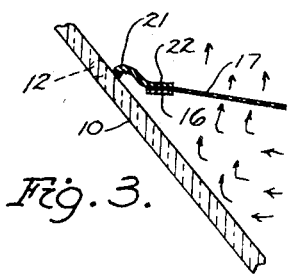
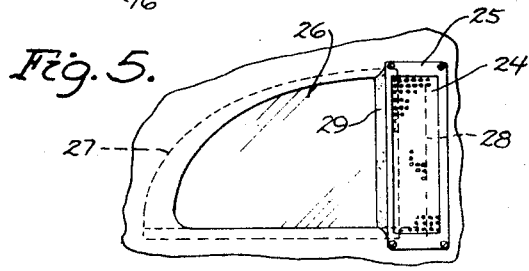
INVENTOR.
Harvey T. Moler
BY
Edward M. Apple
ATTORNEY.

Patented Jan. 3, 1950

2,493,685

UNITED STATES PATENT OFFICE 2,493,685

VENTILATING DEVICE FOR AUTOMOBILES

Harvey T. Moler, Detroit, Mich.

Application September 15, 1947, Serial No. 774,158

4 Claims. (Cl. 160—44)

1

This invention relates to vehicle bodies, and has particular reference to an automobile body which is provided with ventilators comprising pivotable glass wings.

An object of the invention is to provide a device which serves to dampen the effects of the stream of air which enters the automobile body adjacent the ventilator.

Another object of the invention is the provision of a device of the character indicated, which serves to muffle the sound of the inrushing air when the ventilator wing is open widely.

Another object of the invention is to provide an accessory for use with the pivotable ventilator on an automobile window, which will prevent the entrance of rain to the interior of the vehicle body, regardless of the position of the ventilator wing.

Another object of the invention is to provide a device of the character indicated, which tends to divide the air stream into a plurality of small air streams, which division and agitation of the air stream tends to reduce its temperature.

The foregoing and other objects and advantages of the invention will become more apparent as the description proceeds, reference being made from time to time to the accompanying drawings, forming part of the within disclosure, in which drawings:

Fig. 1 is a side elevational view of the upper front portion of an automobile body having a pivotable glass ventilator, and equipped with a device embodying the invention.

Fig. 2 is an enlarged section taken substantially on the line 2—2 of Fig. 1.

Fig. 3 is an enlarged fragmentary detail showing the relation of the ventilator and the damper plate when the ventilator is turned to the extreme open position.

Fig. 4 is an enlarged fragmentary detail of a portion of the device embodying the invention in which a screen instead of a perforated plate is used in the construction of the damper panel.

Fig. 5 is a modified form of the device embodying the invention shown in conjunction with a slidable window glass panel.

Referring now more particularly to the drawings, it will be understood that in the embodiment herein disclosed, the reference character 7 indicates the top of an automobile body having a door 8 which is provided with a main door glass 9 and a conventional glass ventilator panel 10, which is pivoted at top and bottom to the door frame, as at 11 and 12.

2

A conventional channel member 13 extends across the window opening, and serves to reinforce the door frame and act as a closure member between the panes of glass 9 and 10. A downward extension 14 of the body 7 serves as a molding for the automobile windshield 14A.

The parts just described are conventional parts of the standard automobile body, and form no part of the invention per se. The invention resides in a combination of the parts just described, and the parts which I will now describe.

Secured by means of screws 15, or other suitable means, to the outside of the door 8 is a frame member 16 which is shaped to the door contour and is of such size as to define an area substantially the same size as the area of that portion of the glass panel 10 which is positioned ahead of the pivot points 11 and 12.

Secured to the frame 16 by means of welding, or other suitable means, is a perforated plate 17. A rubber gasket 18 is positioned between the frame 16 and the perforated plate 17, which gasket is provided with vertical grooves 19 adapted to permit the escape of moisture which might collect along the lower edge 20 of the frame 16.

A channel member 21, which is preferably made of rubber, is secured along the trailing edge of the frame, as at 22, and its free edge is adapted to contact the surface of the ventilator panel 10 near its axis of rotation as shown in Figs. 2 and 3, and serves to collect and downwardly direct any rain which would enter the area defined between the panel 10 and the perforated plate 17 when the ventilator panel is wide open as shown in Fig. 3.

In Fig. 4 I show a modification of the invention in which a screen 23 is employed instead of the perforated plate 17, as shown in Figs. 1 to 3 inclusive.

In Fig. 5 I show another modified form of the invention in which the perforated plate 24 and frame 25 are mounted adjacent the front end of a rear window 26. In this embodiment, the rear window pane 26 is adapted to slide rearwardly to the position indicated by the dotted lines 27 to define a ventilating opening 28. In this embodiment a channel shaped rubber member 29 is positioned along the rear edge of the frame 25, and serves as an air scoop and a collector for any rain which would strike the perforated plate 24.

Having described my invention, what I claim and desire to secure by Letters Patent is:

1. In a device of the character described, including an automobile body having a window opening and a pivotable glass panel for closing the same, the combination of a perforated plate positioned over said opening, said perforated plate being provided with a frame, there being a vertically positioned flexible member secured to said frame along the trailing edge thereof and adapted to contact said movable glass panel.

2. In a device of the character described including an automobile body having a window opening and a pivotable glass panel for closing the same, the combination of a perforated plate positioned over said opening, a frame for said perforated plate, a flexible gasket having the contour of said frame positioned between said plate and said frame and means in said gasket for disposing of any excess moisture collected on said frame.

3. In a device of the character described including an automobile body having a door with an opening therein, and a pivotable glass panel for closing said opening, the combination of a rigid perforated member secured to said door and covering the area of said opening ahead of the axis of rotation of said panel, there being, a vertically positioned flexible channel like member mounted on the trailing portion of said perforated plate and contacting the intermediate portion of said rotatable glass panel, for collection and disposal of any moisture gathered between said plate and said panel.

4. An article of manufacture for mounting over a window opening in an automobile body, comprising a perforated rigid member having means for supporting and securing it to the automobile body, and a flexible channel-like member mounted on the trailing portion of said perforated member between said member and the adjacent glass of said car window, for gathering and disposing of any moisture collected between said perforated member and said window glass.

HARVEY T. MOLER.

REFERENCES CITED

The following references are of record in the file of this patent:

UNITED STATES PATENTS

| Number | Name | Date |
|---|---|---|
| 275,223 | Langtry | Apr. 3, 1883 |
| 1,945,816 | Leigh | Feb. 6, 1934 |
| 2,019,127 | Flym | Oct. 29, 1935 |
| 2,059,924 | Woina | Nov. 3, 1936 |
| 2,109,249 | Hickman | Feb. 22, 1938 |
| 2,354,443 | Schirra | July 25, 1944 |